United States Patent [19]
Adkins

[11] Patent Number: 5,172,766
[45] Date of Patent: Dec. 22, 1992

[54] RADIALLY GROOVED HORSEHOES

[76] Inventor: Kirk E. Adkins, 400 W. Creekside Cir., Dixon, Calif. 95620

[21] Appl. No.: 743,934

[22] Filed: Aug. 12, 1991

[51] Int. Cl.⁵ .............................................. A01L 5/00
[52] U.S. Cl. .......................................... 168/14; 168/28
[58] Field of Search ............... 168/4, 12, 13, 14, 26, 168/28, DIG. 1

[56] References Cited

U.S. PATENT DOCUMENTS 3,490,536  1/1970  Hourlier ................................. 168/4
4,844,172  7/1989  Lee ........................................ 168/13
4,878,541  11/1989  Pedersen ........................... 168/14 X

FOREIGN PATENT DOCUMENTS 194435  3/1923  United Kingdom .................. 168/13
231571  3/1925  United Kingdom .................. 168/13

Primary Examiner—Robert P. Swiatek
Attorney, Agent, or Firm—William S. Bernheim

[57] ABSTRACT

A horseshoe is for the protection of a horse's foot offering absorption of concussion and adequate traction.

6 Claims, 1 Drawing Sheet

RADIALLY GROOVED HORSEHOES

BACKGROUND OF THE INVENTION

1. Field of the Invention

The present invention relates to horseshoes and, more particularly, to a horseshoe having improved shock absorption characteristics.

2. Description of the Prior Art

For many centuries the hooves of horses have been shod with a shoe in order to offer protection to horses' feet. Over this period of time, horseshoes have consisted of a variety of materials and styles. Some of the early horseshoes were made out of iron and were forged to fit the varying sizes and shapes of the horses' hooves. A shoe is then nailed onto each hoof. Every three to five weeks due to the growth of the horse's hoof, the shoe is removed and the foot trimmed. The shoe can be reused or reset each time until it is worn out at which time it is replaced with a new shoe. Although iron shoes offer protection to the horses' foot, they offer little or no absorption of shock and concussion when the horse moves, especially when carrying a rider. Furthermore, iron horseshoes wear smooth and provide little traction on many surfaces.

In recent years horseshoes of various materials and various sizes and shapes have been tried but most have met with little success because of drawbacks. Various plastics and elastomers have been tried. Although they increase the absorption of shock and concussion, they failed to offer proper protection to the horse's hoof because of their lack of stiffness, shapeability and lack of durability. Typically the better as a shock absorber, the worse the wear characteristics. Further these shoes have typically worn smooth and as a result traction is lost.

There have also been attempts to incorporate horseshoe pads as an integral part of a metal horseshoe. Generally, these are plastic or leather pads which are attached to the top part of the horseshoe. However, having the pad between the horse's hoof and the metal horseshoe provides some absorption of the shock and concussion forces but it weakens the overall stability of the shoe. Absorption translates into movement of the shoe relative to the hoof which in turn loosens the nails holding the shoe to the hoof.

Aluminum shoes are also in use. Use of aluminum shoes is not always suitable because of their decreased resistance to abrasion relative to iron shoes.

The traditional method for fitting metal shoes includes heating and forging the shoe to the shape of the horse's hoof. This is time consuming, expensive and creates a host of problems. A forge, an anvil and a multitude of hand tools are needed which must be moved to the horse's location. Manufactured shoes are available that simplify greatly the process of horseshoeing but it still remains a labor intensive process shaping the shoe to the hoof.

Nails are used to hold the horseshoe to the horse's hoof. There are generally at least six to ten nails spaced along the circumference of the shoe. The nail heads are countersunk into the shoe to maintain the attachment of the shoe to the hoof as the shoe wears. Factory made shoes customarily come with prepunched holes in grooves along the circumference for proper nail placement.

STATEMENT OF THE OBJECTS

Accordingly, it is the objective of the present invention to provide an aluminum horseshoe with an elastomer pad molded to the bottom side of the horseshoe and a thin elastomer pad molded to the top of the aluminum shoe in order to provide superior absorption of shock and concussion. It is the further objective of the present invention to provide a horseshoe that can be made to the shape of the horse's hoof by saw cutting, grinding, sanding or rasping.

It is also intended to provide a shoe having increased flexibility for placing nail holes.

Other objectives, advantages and novel features of the invention will become apparent to those skilled in the art, upon examination of the invention and the accompanying drawings.

BRIEF DESCRIPTION OF THE DRAWINGS

Further objectives and advantages of the invention will be apparent from the following detailed description, taken in conjunction with the accompanying drawings illustrating a preferred embodiment of the invention. The drawings are.

DETAILED DESCRIPTION OF A PREFERRED EMBODIMENT

Figure 1:
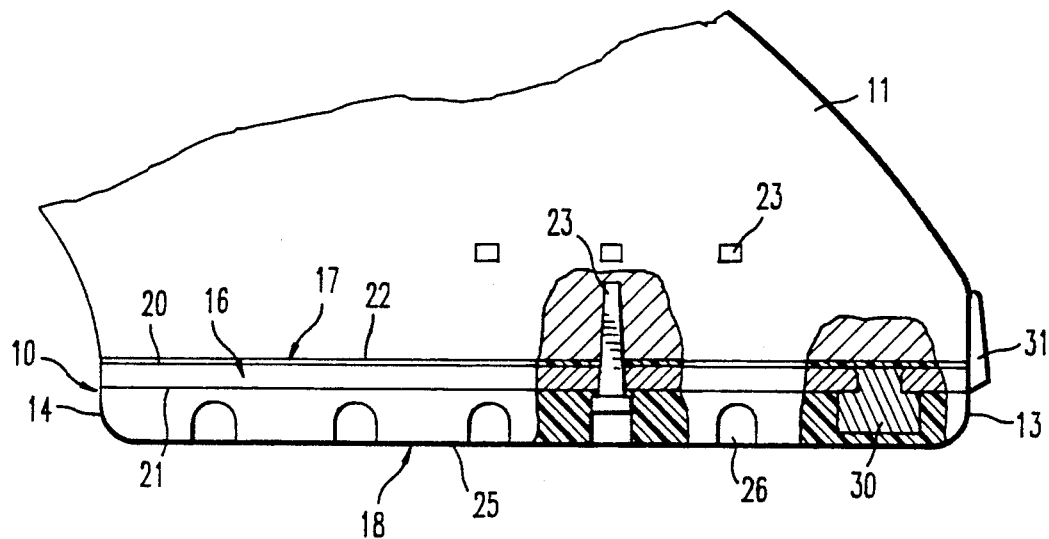
FIG. 1 is a side view not to scale of the padded horseshoe in accordance with the invention.
Figure 2:
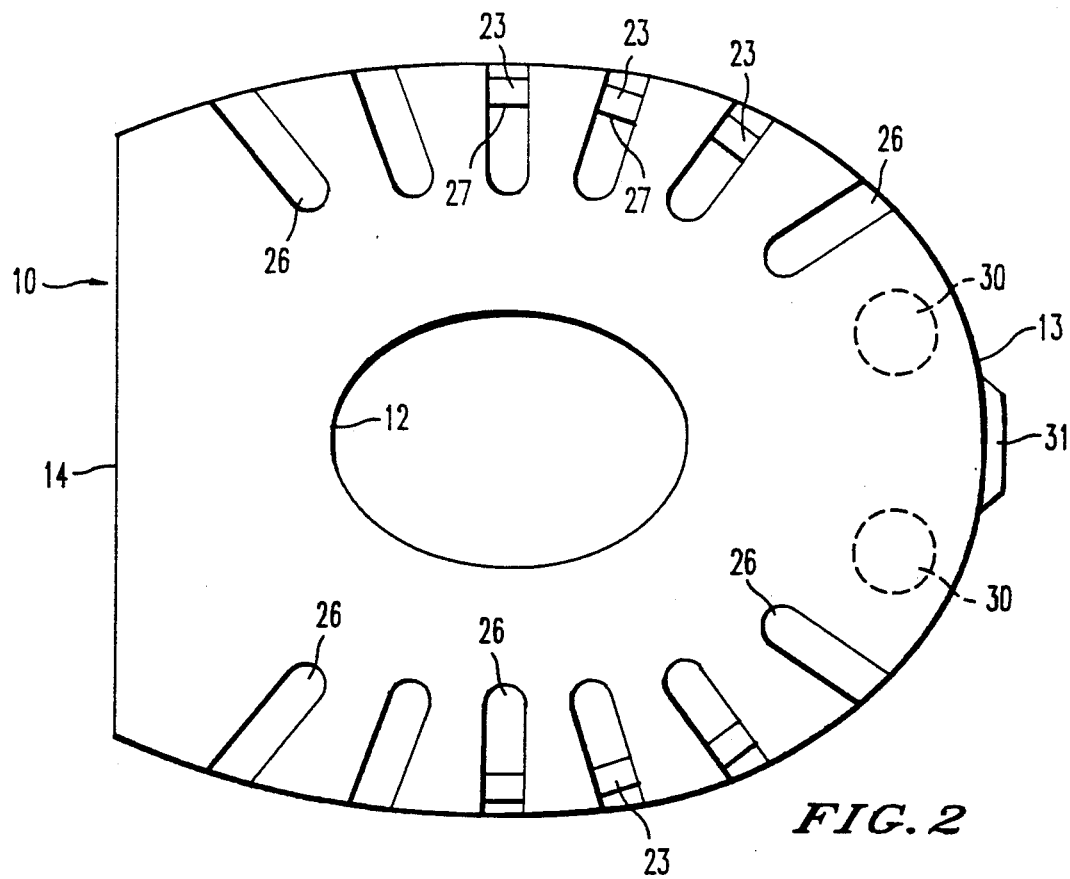
FIG. 2 is a bottom view not to scale of the pad and pad tread that is molded to the aluminum metal plate in accordance with the invention.

In FIG. 1, a shoe 10 is shown attached to the hoof 11 of a horse. The shoe 10 is generally in the shape of a horse's hoof, more particularly, shaped as a flat pad with a center hole 12 of at least 1 and ½ square inches. The center hole 12 is preferably elliptical with the long axis parallel with a line from the toe to the heel of the hoof 11. The purpose of the center hole 12 is to allow for easier removal of the shoe for resetting. The shoe 10 will be manufactured in a number of general sizes and shapes and than ground, sanded or rasped to fit a particular hoof 11. The shoe 10 has a toe 13 which is fitted to the front or toe of the hoof 11 and a heel 14 which is fitted to the back or heel of the hoof 11. Preferably, the area of the shoe covers at least 40% of the area under the hoof 11 The large surface area allows for more foot coverage and hence more protection. The large surface area also allows for the use of soft polymers while still retaining the ability to adequately resist cutting, tearing and premature wear.

The shoe 10 includes three layers. A first layer 16 is sandwiched between a second thin layer 17 and a third thick layer 18. The first layer 16 is to provide rigidity and is constructed of aluminum metal and has a thickness between 0.10 inches and 0.30 inches, preferably about about 0.16 inches. The first layer 16 is flat and has an upper surface 20 and a lower surface 21. A shoe constructed of aluminum alone does not have the wear and shock absorption characteristics of the shoe 10 of this invention.

The second thin layer 17 has an upper surface 22 and lower surface 19 and is flat and has a thickness between 0.01 inches and 0.06 inches preferably about 0.02 in thickness. The second layer is constructed of an elastomer, such as polyurethane and is molded to the first layer 16 so that in use the second layer 17 is sandwiched with the upper surface 22 in contact with the hoof 11 and the lower surface 19 attached to the upper surface 20 of the first layer 16. The second layer 17 provides some buffer protection for the upper surface 20 of layer 16 from corrosion that can occur with direct contact of layer 16 with hoof 11. The thinness of the second layer 17 is important so that conventional horseshoe nails 23 and shoeing techniques are retained and so that the nails 23 remain tightly clinched and do not work loose.

The third thick layer 18 has an upper surface 24 and a lower surface 25 and is flat and has a thickness between 0.10 inches and 0.50 inches preferably about 0.40 in thickness. The third layer 18 is constructed of an elastomer, such as polyurethane, which is preferably the same material as that of the second layer 17 to simplify molding. The third layer 18 is molded to the first layer 16 so that in use the upper surface 24 of the third layer 18 is attached to the lower surface 21 of the first layer 16 and the lower surface 25 of the third layer 18 contacts the ground. The material of the third layer 18 is relatively soft and has a measurement of between 75 and 95 Shore A. The softness provides superior absorption of shock and concussion and superior traction on many surfaces.

In the lower surface 25 of the third layer 18 are multiple molded radial grooves 26 of at least 0.375 inches in length, preferably about 1.0 inch; at least 0.188 inches in width, preferably about 0.250 inches; and at least 0.125 in depth, preferably about 0.250. The grooves 26 form a tread pattern and a countersunk area for the head of the horseshoe nails 23 that are used to attach the shoe 10 to the hoof 11. There are at least four grooves 26, preferably twelve. The grooves 26 extend from the periphery of the shoe 10 inward. The shoe 10 does not normally come with predilled nail holes 27 but are drilled about 0.375 inches from the periphery along a groove 26 after the shoe 10 has been modified to fit the hoof 11. It is easier to drill or punch the nail holes 27 in the inventive shoe 10 than in an iron horseshoe. Use of on-site drilling provides greater flexibility in fitting a shoe 10 on a particular hoof 11.

Preferably, two studs 30 of the same material as the first layer 16 extend outward and downward from the lower surface 21 of the first layer 16 adjacent the toe 13 of the shoe 10 and into the third layer 18. Preferably, the studs 30 extend the same length as the thickness of the third layer 18 so the bottoms of the studs 30 are flush with the lower surface 25 of the third layer 18. These studs 30 prevent premature wear or breakdown of the third layer 18 under hard use and also can serve as a toe grab to increase traction on certain surfaces. Additional studs may be placed about the shoe 10 to further add traction and better wear characteristics for varied terrain and shoe usage.

Further, the shoe 10 can be equipped with a toe clip 31 of the same material as the first layer 16 to extend outward from the toe 13 of the shoe 10 and upward beyond upper surface 22 of the second layer 17. The toe clip 31 aids retention of the shoe 10 on the hoof 11 by preventing the shoe 10 from sliding back or from side to side on the hoof 11. The shoe 10 can be fitted with more than one clip 31 depending on the type and condition of the hoof 11 that the shoe 10 is nailed upon.

What is claimed is:

1. A shoe for attaching to the hoof of a horse and shaped as a pad with a center hole of at least 1 and ½ square inches comprising three layers:
    (a) a first metal layer comprising aluminum with a thickness between 0.10 inches and 0.30 inches and having an upper surface and a lower surface;
    (b) a second thin polymer layer with a thickness between 0.01 inches and 0.06 inches and an upper surface and a lower surface and having the lower surface thereof attached to the upper surface of the first layer and the upper surface suitable to be in contact with the bottom of the hoof of a horse for an extended period;
    (c) a third thicker polymer layer with a thickness between 0.10 inches and 0.50 inches and an upper surface and a lower surface and having the upper surface thereof attached to the lower surface of the first layer;
    (d) the third layer having three or more molded radial grooves of at least 0.375 inches in length and a depth of at least 0.125 inches in the lower surface of the third layer to form a tread pattern and a countersink area for the heads of shoe nails.

2. The shoe of claim 1 in which two studs of the same material as the first layer extend outward from the lower surface adjacent the toe of the shoe and into the third layer.

3. The shoe of claim 1 in which the center hole of the pad is elliptical.

4. The shoe of claim 1 in which the material comprising the third layer has a softness of between 75 and 95 Shore A.

5. The shoe of claim 1 in which the area of the shoe covers at least 40% of the area under the hoof.

6. The shoe of claim 1 in which a toe clip of the same material as the first layer extend outwards from the toe of the shoe and upward beyond the second layer.

* * * * *